Jan. 17, 1950 W. A. SONNETT ET AL 2,495,079
GAME BALL
Filed Aug. 1, 1947
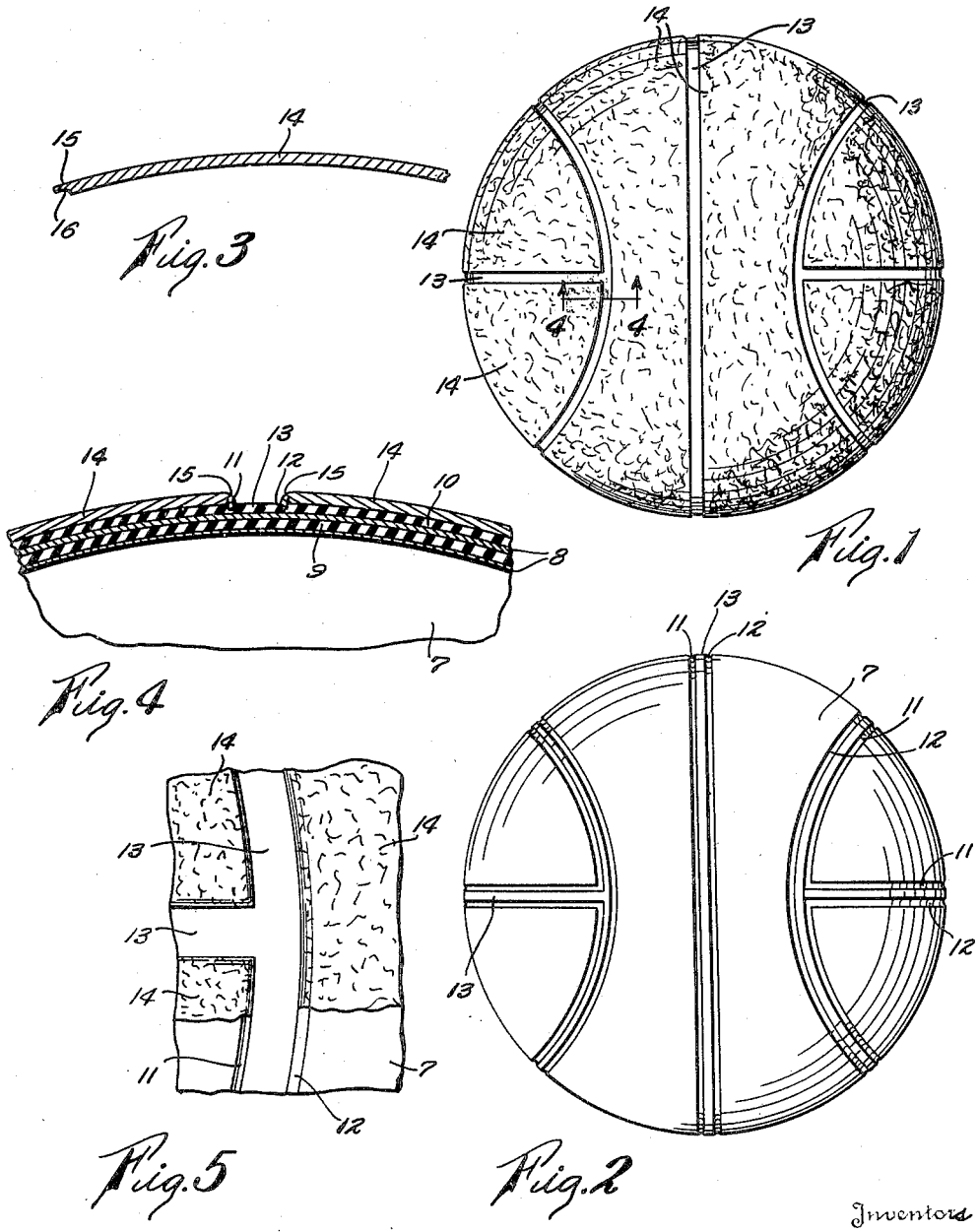
Inventors
William A. Sonnett
William J. Sonnett Patented Jan. 17, 1950

2,495,079

UNITED STATES PATENT OFFICE 2,495,079

GAME BALL

William A. Sonnett and William J. Sonnett, Ada, Ohio

Application August 1, 1947, Serial No. 765,426

8 Claims. (Cl. 273—65)

The present invention relates to inflatable game balls such as basket-balls, foot-balls, and volley-balls and is particularly directed to improvements in securing the edges of cover sections to the carcass of balls of the class mentioned and to a novel seam formed by the cover sections and the ball carcass.

An object of the invention is to provide a simulated seam for the cover of a game ball which insures better gripping and holding of the ball when it is caught and thrown and in the particular cases of foot-balls and soccer-balls provides an improved frictional contact between the ball seams and a player's shoe when the ball is being kicked.

Another object of the invention is to provide a simulated seam for a game ball which has a bottom or trough portion comprising the surface of the outer layer of the ball carcass and wherein the edges of adjacent cover sections are each turned down into one of a pair of spaced grooves extending along and defining the margins for the seam bottom.

A further object of the invention is to provide a durable seam for game balls having the foregoing characteristics which is simple in construction and inexpensive to manufacture.

Other objects of our invention will be apparent from the following specification and the accompanying drawings wherein:

Fig. 1 is an elevational view of our game ball illustrating our improved seam construction.

Fig. 2 is an elevational view of the inflated carcass to which the cover sections are secured.

Fig. 3 is a fragmental, cross sectional view of a cover section for our ball.

Fig. 4 is an enlarged cross sectional view taken on line 4—4 of Fig. 1.

Fig. 5 is an enlarged, fragmental plan view of a section of our finished game ball showing the intersection of two seams therefor.

The embodiment of our invention is particularly adapted for use in connection with inflatable game or play balls having a molded flexible carcass and a number of leather or imitation leather cover sections adhesively fastened or otherwise secured to the carcass. With reference to the drawings wherein like numerals indicate similar parts a hollow-spherical carcass 7 is built up from a number of layers of fabric materials 8 (Fig. 4) having vulcanized rubber layers 9 interposed therebetween. The carcass has an outer layer 10 of vulcanized rubber whose outer surface is formed with a number of pairs of spaced grooves 11 and 12 which define on the surface of the carcass the position of the seams for the finished ball. With particular reference to Figs. 4 and 5 it will be noted that the grooves are inset in the outer rubber layer of the ball carcass and have positioned between them a smooth surface 13 which lies on the same radius as that of the overall outer surface of the carcass.

The carcass is preferably molded by placing a number of alternate layers of textile material and unvulcanized rubber in a heated mold, inflating the carcass within the mold and thereafter applying heat to the mold to vulcanize the rubber layers. During this process a series of ribs projecting inwardly from the interior, carcass forming surface of the mold may produce the pairs or grooves 11 and 12 in the carcass during the molding process. Obviously our ball carcass could be formed with a moldable outer surface by methods other than that set forth herein or the pairs of grooves may be formed in a completed ball carcass by re-heating the surface portion of the ball where the pairs of grooves are to be formed and impressing said surface portion with a suitable groove forming mold.

A number of independent cover sections 14 are cemented or otherwise secured in spaced apart relationship to the outer surface of the carcass 7 and as illustrated in Fig. 3 the marginal edge portions 15 of the covers are thinned or reduced by skiving 16 made in the interior edge portions of the said covers. The skived edge portion is shown in Fig. 3 as having half the thickness of the cover 14 said thickness being equal to the width of the grooves 11 and 12 formed in the carcass so that when the covers are secured to the carcass the adhesively treated reduced portions of the cover may be turned downwardly into the grooves and secured therein by the adhesive.

It will therefore be noted that a simulated seam is provided for our game ball which has a bottom or trough portion consisting of the smooth and exposed rubber surface 13 of the ball carcass and that the spaced, marginal edges of adjacent cover sections are turned downwardly and adhesively secured in the spaced grooves 11 and 12 formed in the cover surface on each side of the smooth section 13 for the purpose of forming a durable, inexpensive imitation seam that insures better gripping and holding of the game ball when it is caught or thrown.

What is claimed is:

1. A game ball having an inflatable, molded carcass, a connected series of spaced double grooves formed in the outer surface of the carcass, and a casing for said carcass comprising a number of independent, spaced apart sections secured to the carcass and each having a downturned marginal edge snugly positioned in adjacent, connected grooves.

2. A game ball having an inflatable, molded carcass, a connected series of pairs of spaced grooves formed in the outer surface of the carcass, and a casing for said carcass comprising a number of independent, spaced apart sections secured to the carcass, and each having a reduced, downturned marginal edge snugly positioned in adjacent, connected grooves whereby a series of imitation seams are formed between adjacent casing sections each provided with a bottom formed by the carcass surface between each pair of grooves.

3. A game ball having an inflatable, rubber carcass, a connected series of pairs of spaced grooves formed in the outer surface of the carcass, and a casing for said carcass comprising a number of independent, spaced apart sections adhesively secured to the carcass, and each having a reduced, downturned marginal edge snugly positioned in adjacent positioned, connected grooves and adhesively secured therein whereby a series of imitation seams are formed between adjacent casing sections each provided with marginal edges formed by the downturned portions of adjacent casing sections and a recessed bottom formed between the marginal edges by the carcass surface disposed between a pair of grooves.

4. A game ball comprising an inflatable, molded carcass having a smooth outer surface broken only by a connected series of side by side double grooves formed therein, the double grooves of each series defining between them on said carcass surface a narrow exterior trough portion for the ball seam that is interconnected with the trough portions formed by the remaining series of side by side double grooves, and a cover for the carcass having a number of independent sections adhesively secured to the said carcass surface and spaced apart by the narrow trough portions, each section having a downturned marginal edge snugly positioned in adjacent interconnected grooves, and means for adhesively securing the downturned marginal edges of the sections in their respective interconnected grooves.

5. A game ball as set forth in claim 4 wherein the downturned marginal edges of the sections are reduced in width and are snugly positioned in adjacent interconnected grooves.

6. A seam construction for game balls comprising an inflatable, molded carcass having a number of nonintersecting, endless grooves formed therein and each groove having a closed configuration and in proximity to adjacent endless grooves, continuous sidewalls for each groove, a bottomwall interconnecting the sidewalls, a number of independent cover sections each having its marginal edge portion turned inwardly into its respective endless groove, and means adhesively securing the marginal edge portion of each cover section to the sidewalls and bottomwall of its respective endless groove.

7. A game ball comprising an inflatable, molded carcass having a number of nonintersecting, endless grooves formed therein, each groove having continuous sidewalls extending inwardly into the carcass and to the bottom of the groove interconnecting the said sidewalls, a number of independent cover sections each having its marginal edge portion turned inwardly into the respective endless groove with adhesive securing the marginal edge portion of the cover section to the sides and bottom of the respective endless groove.

8. A game ball comprising an inflatable, molded carcass having a number of endless, nonintersecting grooves formed therein, each groove having continuous sidewalls extending inwardly into the carcass and to the bottom of the groove interconnecting the said sidewalls, a number of independent cover sections each having its marginal edge portion turned inwardly into the respective endless groove with adhesive securing the marginal edge portion of the cover section to the sides and bottom of the respective endless groove, whereby the bottom interconnecting the sidewalls in each groove protects the edge of an independent cover section.

WILLIAM A. SONNETT.
WILLIAM J. SONNETT.

REFERENCES CITED

The following references are of record in the file of this patent:

UNITED STATES PATENTS

| Number | Name | Date |
|---|---|---|
| 2,143,409 | Denkert | Jan. 10, 1939 |